United States Patent [19]
Kurisaki et al.

[11] Patent Number: 5,605,360
[45] Date of Patent: Feb. 25, 1997

[54] CONNECTING STRUCTURE FOR PRESSURE DETECTOR

[75] Inventors: Shogo Kurisaki; Kuniko Suzuki, both of Ibaraki-ken, Japan

[73] Assignee: SMC Kabushiki Kaisha, Tokyo, Japan

[21] Appl. No.: 443,375

[22] Filed: May 17, 1995

[30] Foreign Application Priority Data

Sep. 9, 1994 [JP] Japan .................................. 6-215557

[51] Int. Cl.⁶ ...................... F16L 47/00; G01L 7/00
[52] U.S. Cl. ........................ 285/93; 73/756; 285/322
[58] Field of Search ............................ 285/93, 322, 323, 285/156; 73/49.1, 49.8, 756

[56] References Cited

U.S. PATENT DOCUMENTS

| | | | |
|---|---|---|---|
| 3,917,318 | 11/1975 | Legris | 285/18 |
| 3,999,430 | 12/1976 | Parduhn | 73/146.3 |
| 4,108,008 | 8/1978 | Jowett et al. | 73/756 |
| 4,505,157 | 3/1985 | Le | 73/756 |
| 4,598,581 | 7/1986 | Brekke | 73/756 |
| 4,606,783 | 8/1986 | Guest | 285/323 |
| 4,807,911 | 2/1989 | Short | 285/323 |
| 4,978,148 | 12/1990 | Kosugi et al. | 285/137.1 |
| 5,105,653 | 4/1992 | Konter | 73/756 |

FOREIGN PATENT DOCUMENTS 333288 2/1991 Japan .

Primary Examiner—Eric K. Nicholson
Attorney, Agent, or Firm—Oblon, Spivak, McClelland, Maier & Neustadt, P.C.

[57] ABSTRACT

A pressure detector includes a pressure introducer formed in a pipe with a through-hole defined therein and connected to a pressure sensor at one end. A tube fitting is mounted in advance to a fluid passage to which the pressure detector is connected. The other end of the pressure introducer of the pressure detector is inserted axially into an opening of the tube fitting. Thus, the pressure detector is easily connected to the fluid passage without requiring rotating of the pressure detector about the axis of the pressure introducer.

3 Claims, 4 Drawing Sheets

CONNECTING STRUCTURE FOR PRESSURE DETECTOR

BACKGROUND OF THE INVENTION

1. Field of the Invention:

The present invention relates to a connecting structure for a pressure detector with which the pressure detector is connected to an external instrument or a fluid passage in a pressurized fluid circuit.

2. Discussion of the Related Art:

FIG. 4 shows a conventional pressure detector 2. The pressure detector 2 has a body 4 shaped in a substantially rectangular parallelepiped and a display unit 6 provided on the upper surface of the body 4 for displaying a detected pressure. A screw 8 having a screw driver groove for setting a set pressure and an indicator lamp 10 for indicating an operational state of the pressure detector 2 are arranged around the display unit 6. An operator can set a desired set pressure by rotating the screw 8.

The body 4 contains a semiconductor pressure sensor (not shown), for example, for detecting the pressure of air introduced through a pressure-introducing port 12 and converting it into an electric signal. A lead wire 14 is drawn from the upper surface of the body 4, for energizing the pressure sensor and transmitting the detected signal to an external instrument (not shown).

A cylindrical member 16 having the pressure-introducing port 12 at its distal end is integrally coupled to the lower portion of the body 4. The cylindrical member 16 has a male thread 18 defined on its outer surface for connecting and fixing the pressure detector 2 to an external instrument or a fluid passage through which a pressurized fluid flows. When the pressure detector 2 is connected to the external instrument (not shown), the male thread 18 of the cylindrical member 16 is screwed into a hole of the external instrument on which a female thread is defined.

However, when the pressure detector 2 is connected to the external instrument, or when it is disconnected therefrom, the attachment or detachment must be performed by rotating the body 4 of the pressure detector 2 about the axis of the cylindrical member 16, thereby to screw the male thread 18 of the cylindrical member 16 into or out of the hole of the external instrument.

Thus, inconvenience arises in that when there is not enough space for the body 4 to be rotated in the place where the pressure detector 2 is to be connected to an external instrument or a fluid passage, it is hard or impossible to screw the male thread 18 of the cylindrical member 16 into the hole of the external instrument or the fluid passage. This inconvenience has greatly limited the possibility of the pressure detector 2 to be freely installed where it is necessary. Moreover, the above inconvenience has made piping work complicated, and a lot of time and labor must have been consumed therefor.

SUMMARY OF THE INVENTION

The present invention has been made to overcome the inconvenience described above. Therefore, the object of the invention is to provide a connecting structure for a pressure detector with which the pressure detector can be conveniently attached to and detached from a fluid passage.

To achieve the above object, the connecting structure for a pressure detector according to the present invention comprises a cylindrical member having a through-hole defined therein, being connected to said pressure sensor at one end thereof, and an instant tube fitting mounted to said fluid passage in advance, said pressure detector being detachably connected to said passage communicated to an external pressure source by axially inserting the other end of said cylindrical member into an opening of said instant tube fitting.

With the above-described connecting structure, one end of the cylindrical member is axially inserted into the opening of the tube fitting which is mounted in advance to the fluid passage without rotating the body of the pressure detector. Since the cylindrical member is instantly gripped by the tube fitting, the pressure detector can be conveniently connected to the fluid passage even when there is not enough space for the body of the pressure detector to be rotated in the place where the pressure detector is to be installed.

DESCRIPTION OF THE PREFERRED EMBODIMENT

Figure 1:
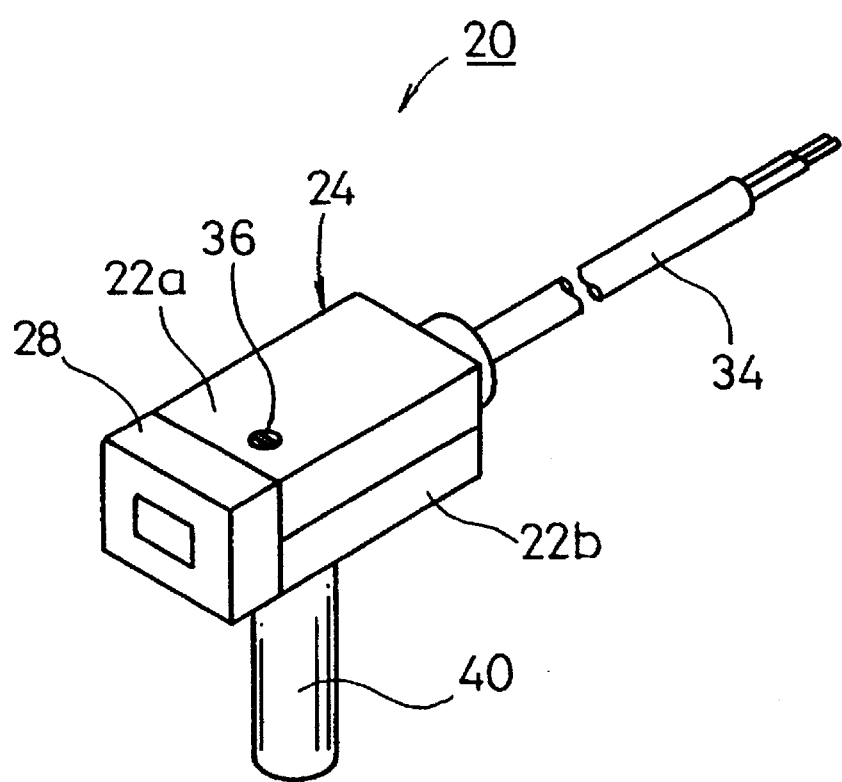
FIG. 1 is a perspective view of a pressure detector according to an embodiment of the present invention.

As shown in FIG. 1, a pressure detector having a connecting structure according to an embodiment of the present invention is denoted generally at a reference numeral 20, and comprises a casing 24 integrally formed with an upper housing 22a and a lower housing 22b, a substrate 26 positioned and held in the casing 24 (see FIG. 2), and a side cover 28 installed at a side face of the casing 24. The substrate 26 includes electronic components 32 such as a pressure sensor 30 (a semiconductor pressure sensor, a capacitance type pressure sensor, or the like), comparators, LEDs, resistors, transistors, lead wire pads, etc, which are electrically connected to form electronic circuits. Detected signals outputted from the pressure sensor 30 are transmitted to an external instrument through lead wires 34 drawn through the upper housing 22a and/or the lower housing 22b. Detected signals may be converted into digital signals by an external A/D converter, and digitally displayed on a digital display which is also an external instrument.

A screw 26 for setting a set pressure is provided in the upper surface of the upper housing 22a. A pressure introducer 40 (a cylindrical member) having a predetermined length and a substantially cylindrical shape extends from a bottom surface of the lower housing 22b. A through-hole 42 which functions as a pressure-introducing passage is defined in the pressure introducer 40. A pressure-introducing port 44 is formed at a distal end of the through-hole, while a proximal end is formed to face the semiconductor pressure sensor 30 via a passage 39 defined in a projection 37.

The operation of the pressure detector 20 basically constructed as above will next be described.

Figure 2:
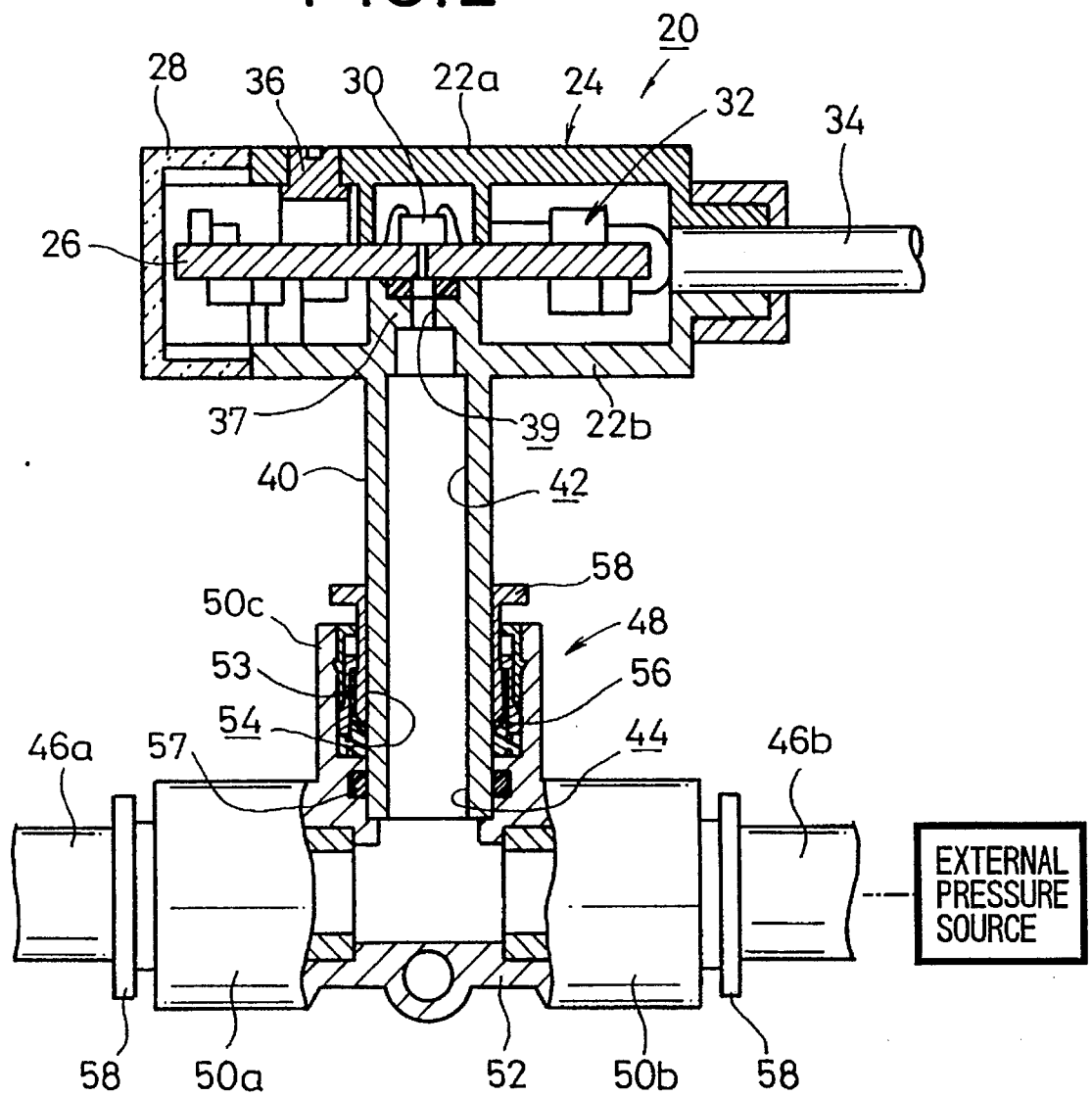
FIG. 2 is a side elevational view partly in cross-section in which the pressure detector shown in FIG. 1 is coupled to fluid piping via an instant tube fitting mounted to a pipe joint.

Firstly, a case in which the pressure detector 20 is connected at an optional position to a fluid passage of a pressurized fluid circuit will be described (see FIG. 2).

A tube which functions as a fluid passage of a pressurized fluid circuit is cut into two parts which comprise tubes or pipings 46a, 46b at a desired position. Cut sections of the tube 46a, 46b are respectively inserted into openings of first and second tube fittings 50a, 50b which comprise a first and second quick release mechanism, respectively, of a tube connector 48 having a body 52 which is formed in a T-shape. The body 52 includes the first and second tube fittings 50a, 50b opposite to each other along an axis of the body 52, and a third tube fitting 50c, which comprises a third and a release mechanism, in a direction perpendicular to the axis.

The first through third tube fittings 50a–50c are constructed substantially identically, in the form of so-called instant (rapid) tube fittings (one touch tube fittings). A collet 53 made of a resilient member is provided in each of the tube fittings 50a–50c. The collet 53 has a chuck 56 for gripping the tube 56a or 56b inserted therein, thereby holding the tube 56a or 56b to stay in an opening 54. As a collet chuck is disclosed in Japanese Laid-open Utility Model Publication No. 3-33288, for example, its detailed explanation is omitted here.

Subsequently, the pressure-introducer 40 is inserted into the opening 54 of the third tube fitting 50c, to couple the pressure detector 20 to the tube connector 48. As a result, the through-hole 42 comes into communication with the passage which passes through the tubes 56a, 56b. At this time, the distal end of the pressure introducer 40 is inserted in the opening 54 of the third tube fitting 50c, and is gripped by the chuck 56 in the same manner as the tubes 46a, 46b to hold it so as to stay in the opening 54. In addition, a seal ring 57 may be provided in an annular groove of the opening 54. The outer surface of the pressure introducer 40 is thus surrounded by the seal ring 57, and the air-tightness can be further improved. It is a matter of course that the air-tightness is maintained by the tube fittings 50a–50c without providing the seal ring 57.

The pressure detector 20 can easily be quick release disengaged from the third tube fitting 50c by downwardly pressing a release bushing 58 provided in each of the tube fittings 50a–50c, thereby releasing the gripped state of the pressure introducer 40 having been attained by the chuck 56.

In the case of the conventional pressure detector 2, it has been difficult to incorporate the pressure detector 2 into a fluid passage of a pressurized fluid circuit. However, the pressure detector 20 according to the present embodiment can easily be incorporated into a fluid passage at a desired position thereof by the use of the tube connector 48 which includes tube fittings 50a–50c.

Figure 3:
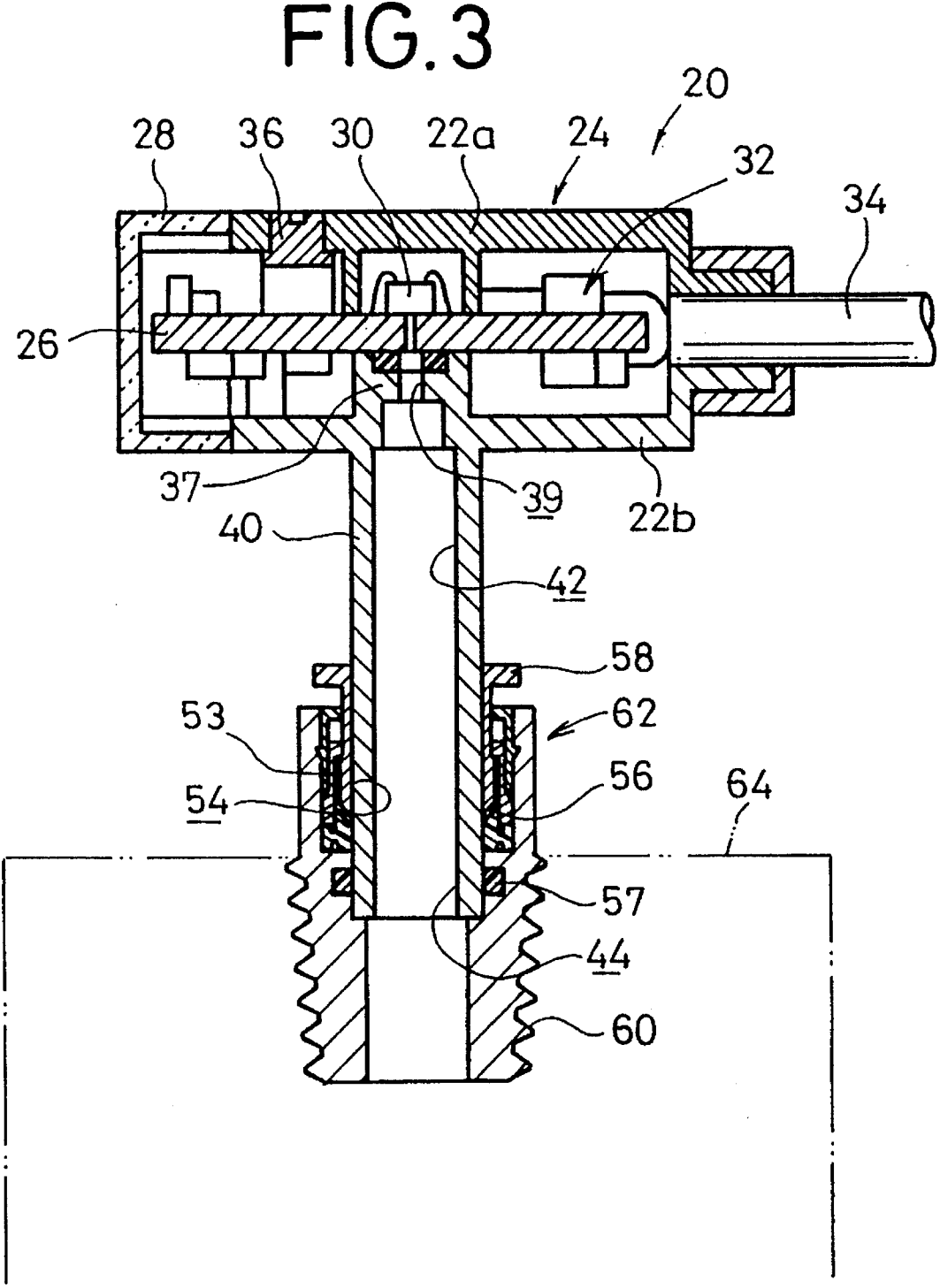
FIG. 3 is a side elevational view partly in cross-section in which the pressure detector shown in FIG. 1 is coupled to an external fluid instrument via an instant tube fitting screwed into the external fluid instrument.
Figure 4:
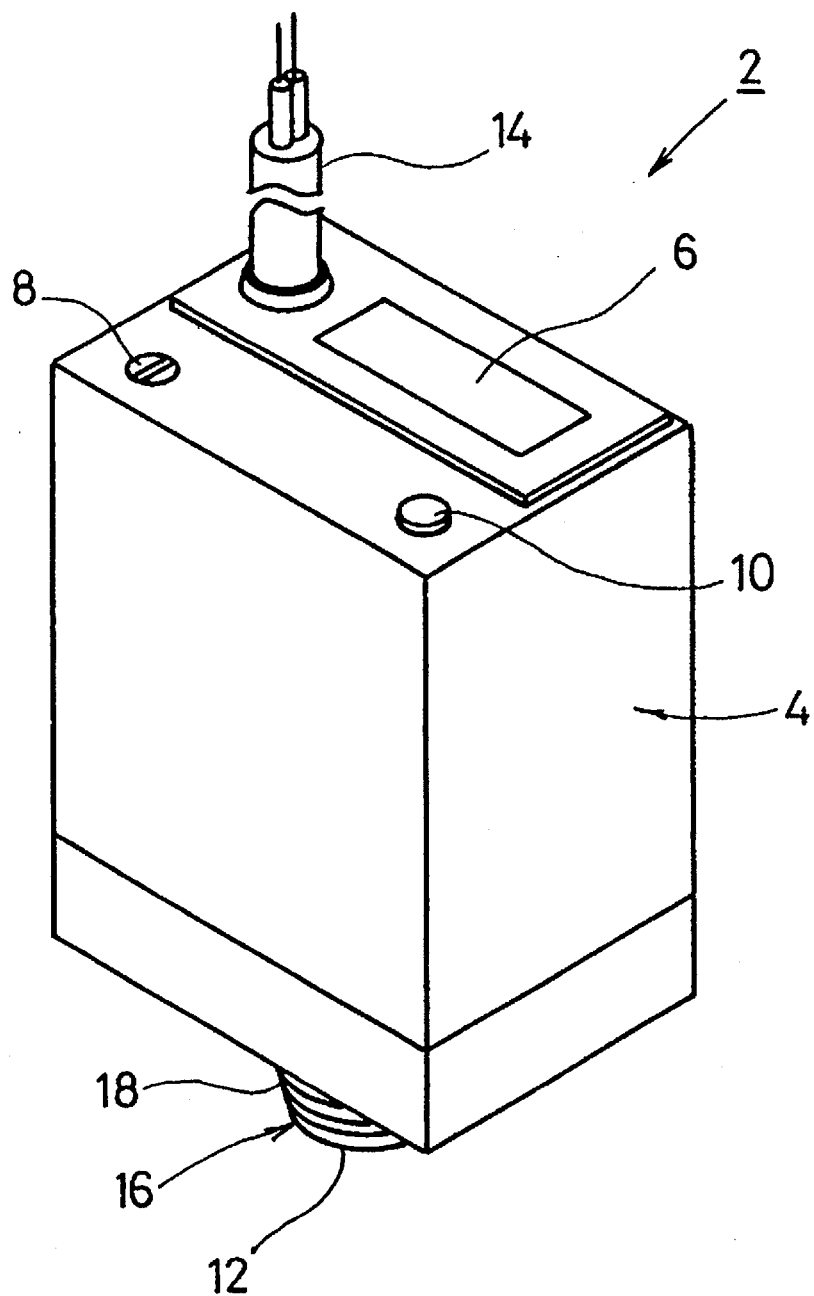
FIG. 4 is a perspective view of a conventional pressure detector.

As shown in FIG. 3, the pressure detector 20 may conveniently be connected to an external instrument 64 by inserting the pressure introducer 40 into an opening 54 of a tube fitting 62 with a thread 60 formed on the outer surface thereof, and screwing the thread 60 of the tube fitting 62 into a hole of the external instrument 64.

As described above, the pressure detector 20 according to the embodiment can be detachably quick release connected to the fluid passage 64a–64b or the external instrument 64 by the use of the tube fittings 50c, 62 even if there is little space around the body 4 of the pressure detector 20, by inserting the pressure introducer 40 into the tube fittings 50c, 62 and coupling it thereto. Thus, the number of work steps in piping work may be reduced, and the piping work can be conducted efficiently and rapidly. Since tube fittings of broad variations with different diameters, configuration, etc. are available, a desired tube fitting can be selected for connecting the pressure detector 20 in accordance with the installation environment.

We claim:

1. A connecting structure connecting a pressure detector to a fluid passage, said pressure detector having a casing and a pressure sensor mounted in said casing, said structure comprising:

a cylindrical member having a through-hole defined therein, said cylindrical member being connected to said casing and communicating with said pressure sensor at one end thereof; and a tube fitting mounted in said fluid passage in advance, wherein said tube fitting comprises at least first, second and third quick release mechanisms, said tube fitting being detachably inserted at an intermediate position between two pipings conveying a pressurized fluid, such that said first quick release mechanism is detachably fitted to an end of a first piping conveying said pressurized fluid, said second quick release mechanism is detachably fitted to an end of a second piping conveying said pressurized fluid, and said cylindrical member is coupled to said third quick release mechanism, said pressure detector being detachably connected to said fluid passage by inserting the other end of said cylindrical member into said third quick release mechanism wherein said casing comprises a projection disposed therein proximate said one end of the cylindrical member, said pressure sensor and a circuit board being disposed on said projection, and said projection further having a hole therein permitting communication between said pressure sensor and said one end of said cylindrical member.

2. A connecting structure according to claim 1, wherein said cylindrical member is formed integrally with said casing.

3. A connecting structure according to claim 1, wherein said fluid passage is fluid piping, to which said tube fitting is mounted.

* * * * *